United States Patent [19]

MacDonald

[11] Patent Number: 4,804,088

[45] Date of Patent: Feb. 14, 1989

[54] ASSEMBLY OF COLLATED NAILS FOR AUTOMATIC NAILERS

[76] Inventor: Donald K. MacDonald, 1180 Kilkare Rd., Sunol, Calif. 94586

[21] Appl. No.: 166,667

[22] Filed: Mar. 11, 1988

[51] Int. Cl.⁴ ............................................. F16B 15/08
[52] U.S. Cl. .................................................. 206/346
[58] Field of Search ............... 206/338, 339, 340, 342, 206/343, 345, 346

[56] References Cited

U.S. PATENT DOCUMENTS

| 212,642 | 2/1879 | Allen | 206/338 |
|---|---|---|---|
| 3,212,632 | 10/1965 | Baum et al. | 206/346 |
| 3,276,576 | 10/1966 | Langas et al. | 206/345 X |
| 3,515,271 | 6/1970 | Bader | 206/345 X |
| 3,711,931 | 1/1973 | Ladouceur et al. | 206/345 X |
| 4,343,579 | 8/1982 | Shelton et al. | 206/345 X |
| 4,600,116 | 7/1986 | Inano et al. | 206/345 X |
| 4,679,975 | 7/1987 | Leistner | 206/343 X |

Primary Examiner—William Price
Attorney, Agent, or Firm—Fliesler, Dubb, Meyer & Lovejoy

[57] ABSTRACT

An assembly of collated nails comprising a nail carrier. In the nail carrier there is provided a strip of material such as paper or plastic on which is provided a bead of flexible, non-hardening adhesive material. Nails are partially embedded at predetermined spacings in the adhesive material. In practice, the strips of nails are wound into circular packages for subsequent use in automatic nailing apparatus.

10 Claims, 6 Drawing Sheets

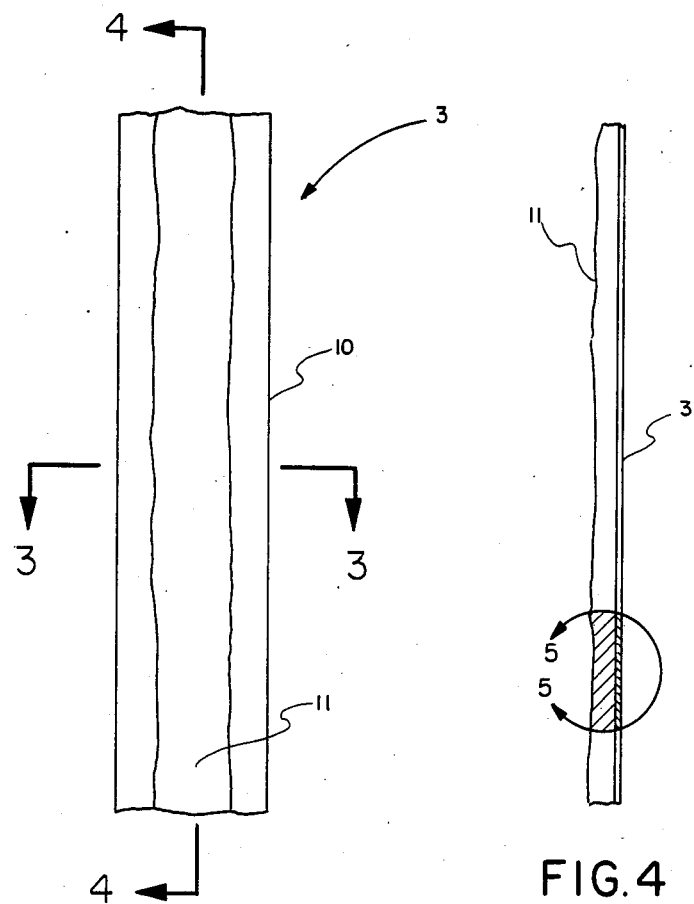
FIG. 2
FIG. 4
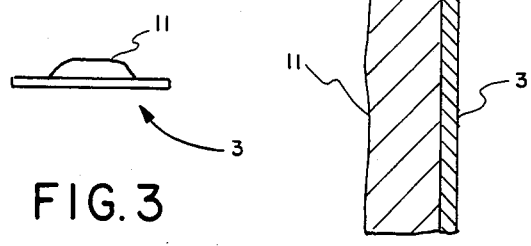
FIG. 3
FIG. 5

ASSEMBLY OF COLLATED NAILS FOR AUTOMATIC NAILERS

BACKGROUND OF THE INVENTION

1. Field of the Invention

The present invention relates to an assembly of collated nails for use in automatic impact nailing apparatus.

2. Description of the Prior Art

An automatic impact nailing apparatus comprises a hammering mechanism for hammering a nail into underlying material. The apparatus may be a single stroke-type apparatus in which compressed air or other means is used for setting the nail in a single stroke of the hammering mechanism or it may be a reciprocating apparatus in which the hammering mechanism comprises a movable piston or the like which moves in a reciprocating fashion to set the nail.

In both types of apparatus, nails are typically fed to the hammering mechanism from a strip or coil of collated nails. For example, in a prior known assembly of collated nails there is provided a plurality of nails which are aligned in a side-by-side fashion with the head of one nail overlapping the head of an adjacent nail. In practice, the nails in this type of assembly are held together by some sort of metallic or non-metallic bonding material. As the hammering mechanism is lowered against the head of the lead nail in the assembly, the nail is broken away from the remaining nails in the assembly and set. An assembly of nails of this type is shown in U.S. Pat. No. 4,610,381.

In another type of assembly of collated nails, the nails are held together in a stair-step or staggered arrangement by means of relatively stiff pieces of plastic. An assembly of this type is sold by Senco Fastening Systems, Cincinnati, Ohio.

A principal disadvantage of the above-described assembly is that the nails are held in an elongated relatively rigid arrangement and require a specially made elongated cartridge holder which projects outwardly from the main body of the nailing apparatus.

In another type of assembly of collated nails there is provided an elongated strip of U-shaped plastic. The parallel legs of the strip are provided with a plurality of clip-like slots for holding the nails with a mechanical clamping action. The base of the U-shaped strip comprises a plurality of sprocket holes.

A principal disadvantage of the U-shaped carrier is that it is relatively expensive to manufacture and load, is bulky and heavy. Also, the U-shaped form of the strip makes it relatively stiff and prevents its being wound into a tight compact package. An assembly of this type is sold by Duo-Fast Corporation, Franklin Park, Ill.

In another type of assembly of collated nails there is provided an elongated strip of paper or other suitable material comprising a plurality of sprocket holes. Between each pair of adjacent sprocket holes there is provided a pair of spaced slits. A nail is inserted in each pair of slits and held there as by friction and/or a bit of adhesive. Thereafter, the strip of nails is wound so as to form a compact circular assembly of collated nails. An assembly of nails of this type is shown and described in applicant's co-pending U.S. patent application Ser. No. 07/061,432, entitled Impact Nailing and Dimpling Apparatus.

In use, the circular assembly of nails is inserted in the body of the nailing apparatus. The strip is advanced by a sprocket engaging the sprocket holes. When properly positioned, the nails are torn from the strip by a movable nail feed arm assembly and positioned beneath the hammering mechanism which thereafter sets the nail.

While the circular assembly of nails described above has the advantage of being compact and insertable in a compartment within the main body of the nailing apparatus, it also has certain disadvantages. First, sprocket holes and a sprocket wheel for engaging the holes to advance the nails are required. Second, tearing the nails from the strip typically produces fibers and bits and pieces of strip material which can clog the nailer or escape from the nailer and adhere to the workpiece.

SUMMARY OF THE INVENTION

In view of the foregoing, a principal object of the present invention is a compact assembly of collated nails comprising an elongated strip of paper or other suitable material. One or more beads of flexible, non-hardening adhesive material is laid on the strip and the nails partially embedded therein.

In another embodiment, the flexible, non-hardening adhesive material is spread across two spaced parallel strings or wires. Thereafter, the nails are partially embedded in the adhesive material.

In all embodiments, the adhesive material comprises a composition of latex or similar material and clay filler which remains flexible and non-hardening, allows the strip of nails to be wound into a circular assembly and releases the nails with a relatively small amount of force applied to the nail.

BRIEF DESCRIPTION OF THE DRAWINGS

The above and other objects, features and advantages of the present invention will become apparent from the following detailed description of the accompanying drawing, in which:

FIG. 2 is a plan view of a nail carrier according to the present invention;

FIG. 3 is a cross-sectional view taken in the direction of lines 3—3 of FIG. 2;

FIG. 4 is a cross-sectional view taken in the direction of lines 4—4 of FIG. 2;

FIG. 5 is an enlarged partial cross-sectional view taken in the direction of lines 5—5 of FIG. 4;

DETAILED DESCRIPTION OF THE DRAWINGS

Figure 1:
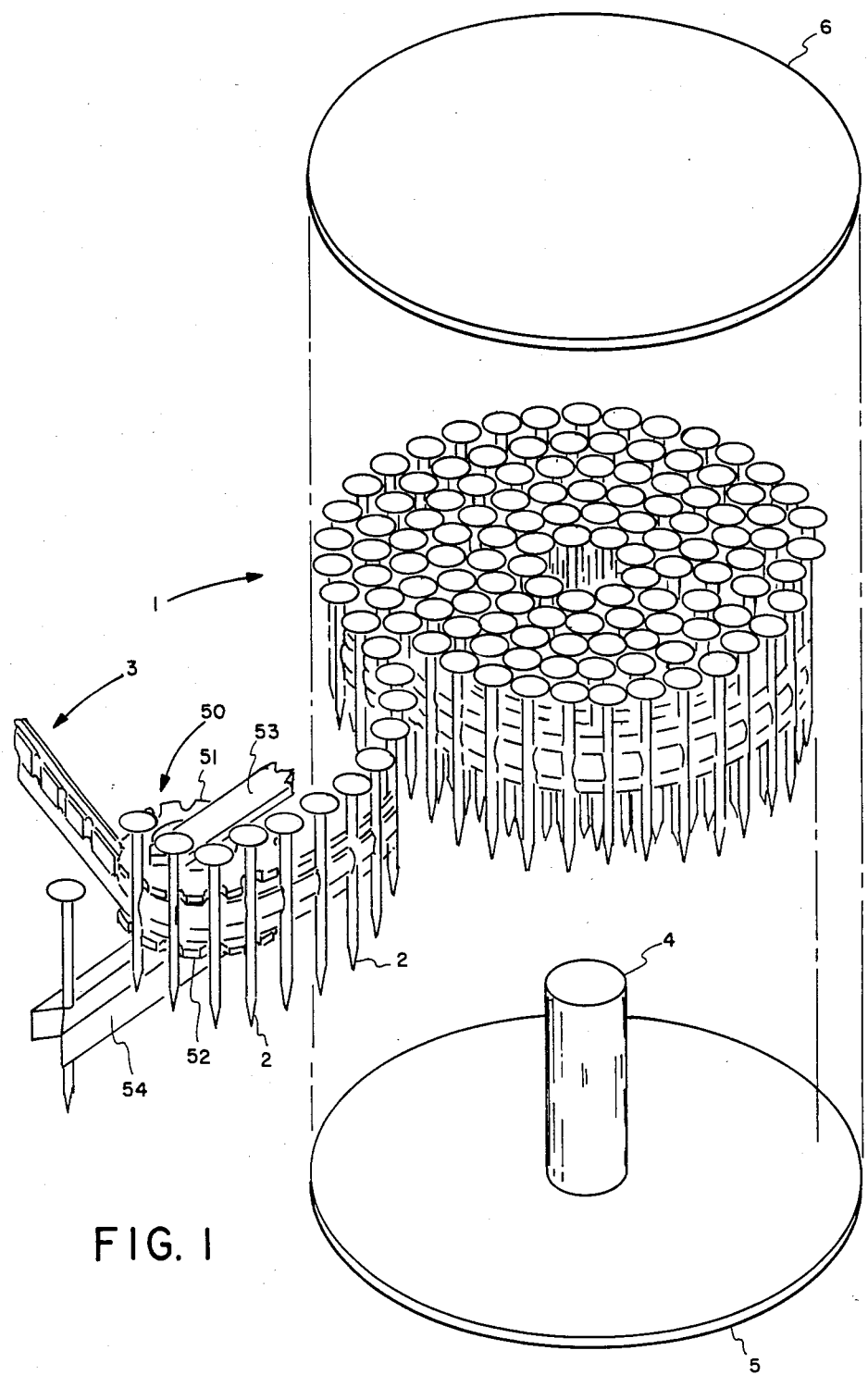
FIG. 1 is a perspective view of an assembly of collated nails according to the present invention.

Referring to FIG. 1, there is provided in accordance with the present invention an assembly of collated nails designated generally as 1. In the assembly 1 there is provided a plurality of nails 2. The nails 2 are carried on a nail carrier designated generally as 3. After the nails 2 are placed on the carrier 3, the carrier 3 and the nails attached thereto are wound about a spindle 4 which rises from the center of a plate 5. A cover 6 is then placed over the nails to form a unique circular assembly. The spindle 4, plate 5 and cover 6 may be made from cardboard, plastic or any other suitable material to facilitate storing, shipping and handling of the assembly 1.

Referring to FIGS. 2-5, the nail carrier 3 comprises an elongated strip 10 and a bead of flexible, non-hardening adhesive material 11. The strip 10 preferably comprises paper of the type used for making gypsum wall board tape. This is particularly desirable because it is relatively inexpensive and readily available. However, other materials such as plastic may also be used. When the nails used comprise 1⅜″ to 1⅝″ long, cup-headed drywall nails used for installing gypsum wall board, the strip is approximately ½″ wide. Its length depends on the size of the assembly, i.e. the number and spacing of the nails to be included in a single assembly.

The bead of flexible, non-hardening adhesive material 11 is placed along the center line of the strip 3. Preferably, the bead 11 comprises a mixture of pure latex and clay filler wherein the filler comprises 20-25% by weight of the final mixture. For example, a suitable latex is called STABOND W600 made by Stabond Corp., Gardena, Calif. A suitable clay filler is called NATKA 1200 made by Harwick Chemical, Atlanta, Ga. The amount of filler used may be varied to control the adhesiveness of the mixture. Other types of materials may be used for the bead 11 provided they result in an adhesive which is flexible, non-hardening, and has sufficient adhesion to securely hold the nails to the strip 3 until they are removed therefrom, as will be described below.

Figure 6:
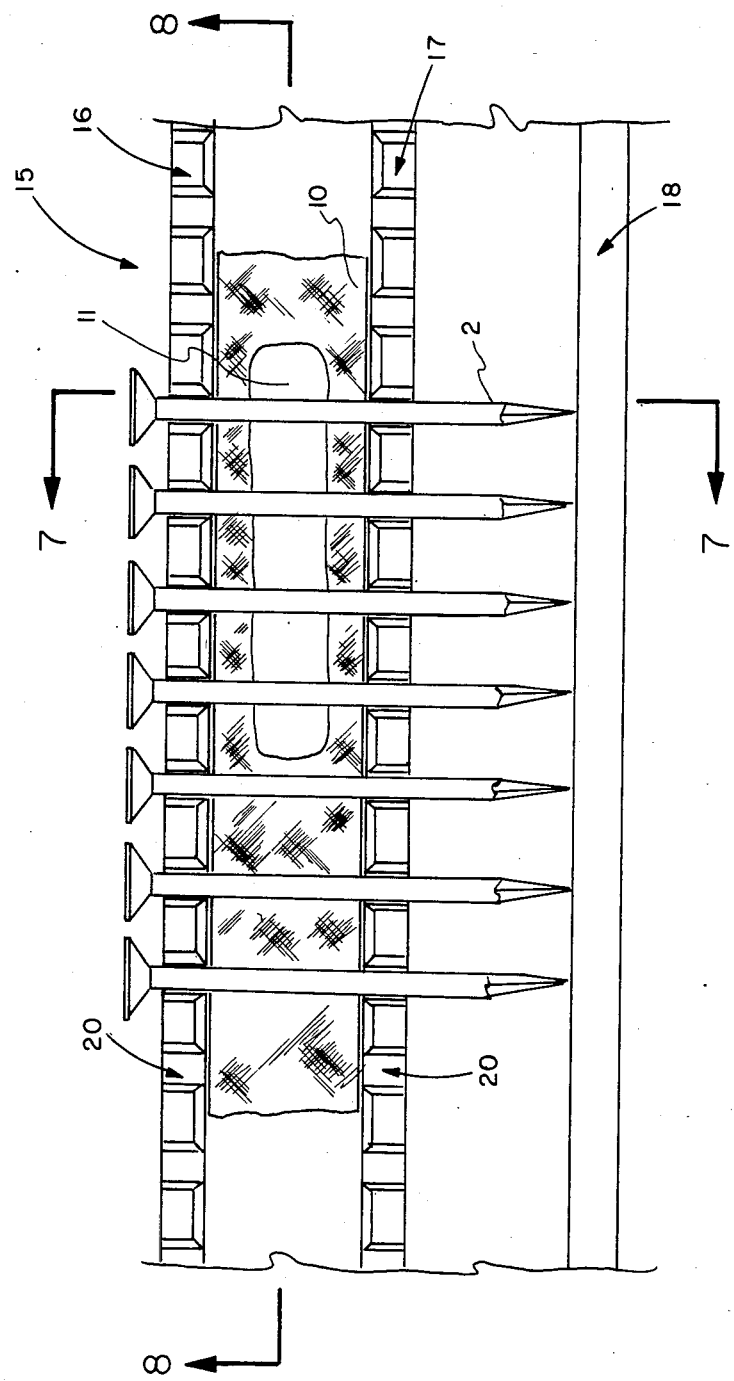
FIG. 6 is a plan view of a tool used for making the assembly of FIG. 1.
Figure 7:
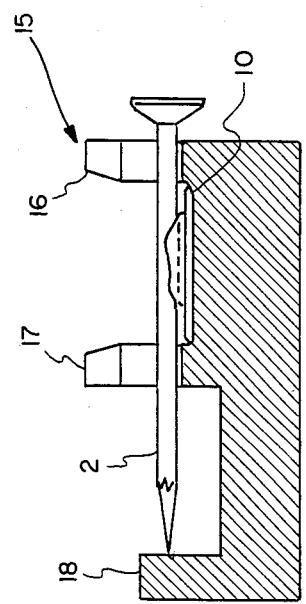
FIG. 7 is a cross-sectional view taken in the direction of lines 7—7 of FIG. 6.
Figure 8:
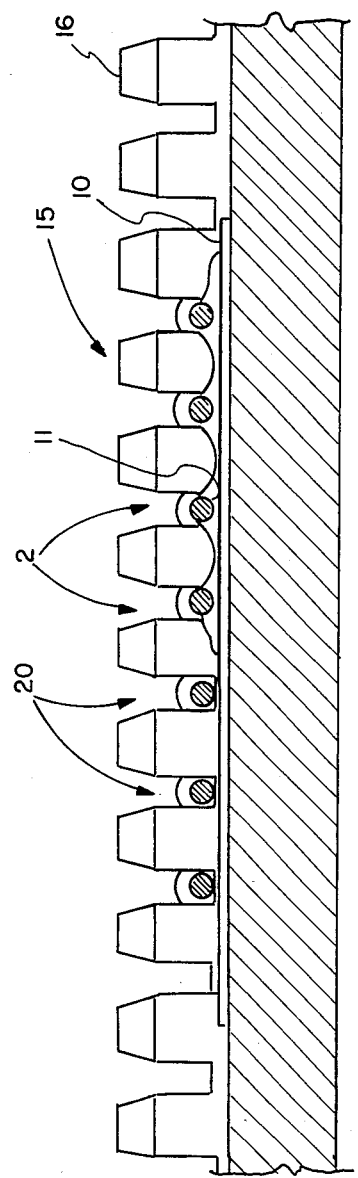
FIG. 8 is a cross-sectional view taken in the direction of lines 8—8 of FIG. 6.

Referring to FIGS. 6-8, there is provided a jig or tool 15 comprising a pair of slotted walls 16 and 17 and a solid wall 18. In the slotted walls 16 and 17 there is provided a plurality of slots 20. The width of the slots 20 is large enough to receive the shank of the nails 2. The walls 16 and 17 are spaced sufficiently far apart to receive the strip 3 therebetween. The bead 11 is placed on the strip 3 either before or after the strip 3 is inserted between the walls 16 and 17. After the strip 3 with the bead 11 located thereon is inserted between the walls 16 and 17, the nails 2 with their points resting against the interior of the wall 18 are slipped between the slots 20 and firmly pressed into the bead 11 until approximately 50% of the diameter of the nail shank is embedded in the bead 11.

After a number of nails 2 corresponding to the number of slots 20 in the walls 16 and 17 have been embedded in the bead 11 on the strip 3, the strip 3 is raised, removing the nails from the slots 20, and shifted right or left to place a fresh unloaded section of strip material between the slots 20. After that is done, the above-described process of embedding the nails in the bead 11 is repeated. By means of the above-described process, a strip 3 of embedded nails 2 of indefinite length can be made. The actual length, as described above, will be determined by the size of the nail assembly receiving compartment in the automatic nailer in which the assembly is inserted.

Figure 11:
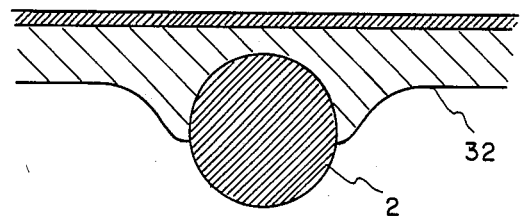
FIG. 11 is an enlarged cross-sectional view taken in the direction of lines 11—11 of FIG. 10.
Figure 10:
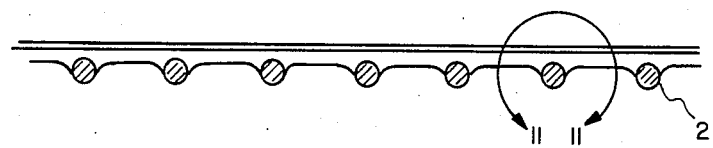
FIG. 10 is a cross-sectional view taken in the direction of lines 10—10 of FIG. 9.
Figure 9:
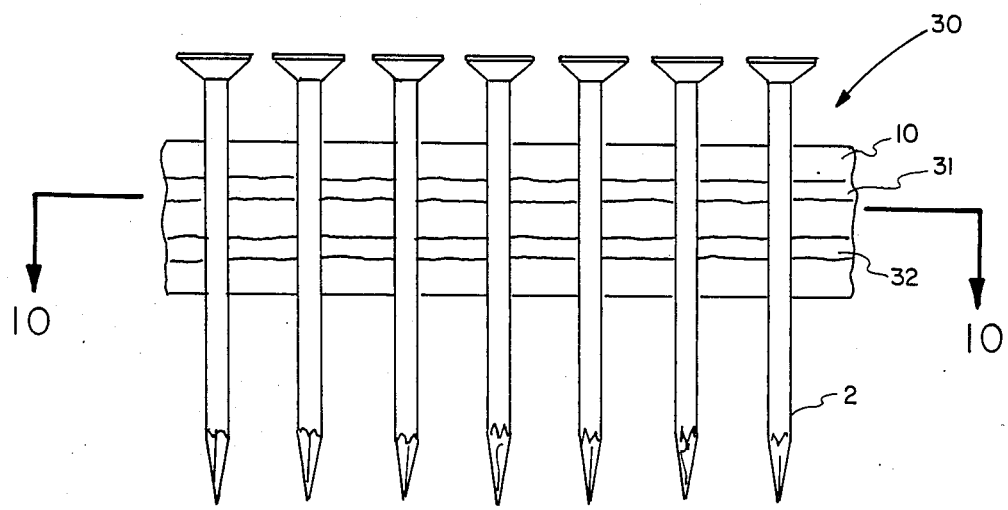
FIG. 9 is an elevation view of another embodiment of the present invention.

Referring to FIGS. 9-11, there is provided in another embodiment of the present invention a nail carrier 30. Nail carrier 30 comprises a strip of material 10 as described above with respect to FIGS. 2-8. Located on the strip 10 there is provided a pair of spaced beads 31 and 32 of flexible, non-hardening adhesive material of the type described above with respect to the bead 11.

To insert the nails 2 on the carrier 30, the carrier 30 is inserted in the tool 15 and the nails 2 embedded in the beads 31 and 32 in the same manner as that used to embed the nails 2 in the bead 11 as described above with respect to FIGS. 7 and 8.

Figures 12, 13:
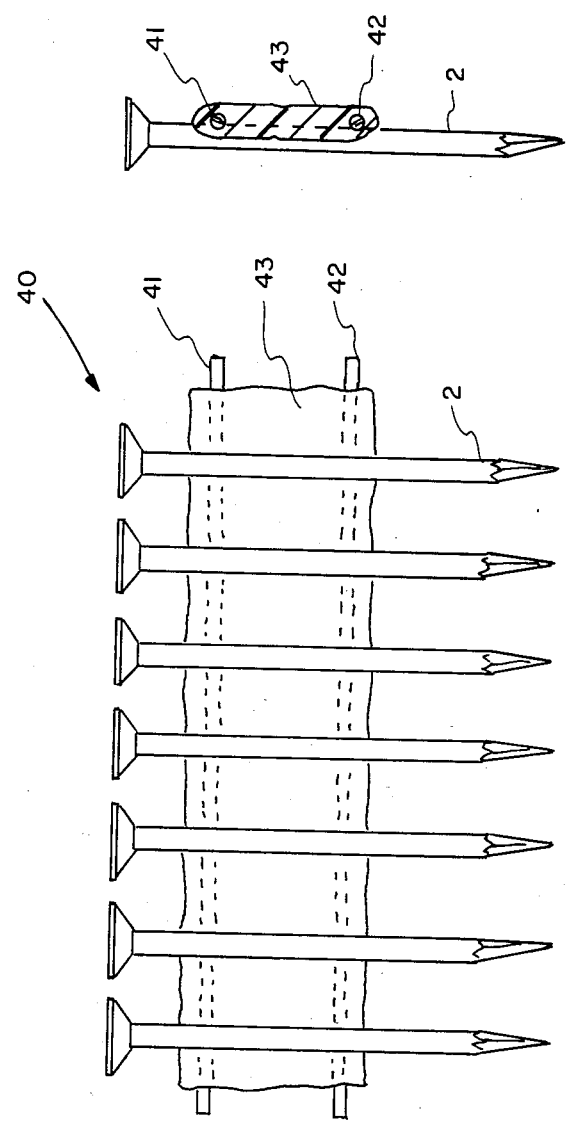
FIG. 12 is a plan view of still another embodiment of the present invention.
FIG. 13 is an end view of FIG. 12.

Referring to FIGS. 12 and 13, there is provided in another embodiment of the present invention a nail carrier 40. In the nail carrier 40 there is provided a pair of flexible inelastic strings 41 and 42. Strings 41 and 42 are encased in a bead of flexible, non-hardening adhesive material of the type described above with respect to bead 11 and beads 31 and 32. The purpose of the strings 41 and 42 is to prevent the material 43 from separating under tension.

In practice, the carrier 3 would be made by laying a bead of flexible, non-hardening adhesive material as described above with respect to beads 11, 31 and 32 in the jig 15 as described above with respect to FIGS. 7 and 8, in place of the strip 10. Thereafter, the strings 41 and 42 would be embedded in the material 43 in the positions shown in FIG. 12 and nails 2 embedded in the material 43 as described above with respect to the previous embodiments.

Referring again to FIG. 1, there is provided in an automatic nailing apparatus with which the assembly of collated nails described herein may be used, a sprocket designated generally as 50. The sprocket 50 has an upper and a lower plate 51 and 52. Plates 51 and 52 have a plurality of teeth-like protuberances extending around the periphery thereof. Between each of the teeth there is a depression which is provided for receiving a nail. Adjacent depressions are separated one from the other according to the amount the sprocket is rotated after each operation and the size of the nail and specifically according to the diameter of the head of the nail so that adjacent nails do not interfere with each other. Located above and below the sprocket 50 there is provided a pair of nail feed arms 53 and 54. In practice, the feed arms 53 and 54 advance, removing the nails 2 from the carrier 3 to which they are attached. After each nail is removed, the sprocket 50 is advanced by a mechanism not shown. As the sprocket 50 is advanced, another nail is positioned to be removed from the carrier by the arms 53 and 54. While the amount of force required to remove the nails from the carrier 3 is relatively minimal, the holding force of the adhesive material in which the nails are embedded is relatively strong in a direction parallel to the direction of strip movement such that it is possible to advance the nails through the sprocket 50 by using the nails rather than a sprocket hole to advance the carrier 3 past the feed arms 53 and 54. This is further made possible by insuring that 3-4 nails are engaged by the teeth of the sprocket 50 as they are advanced to the arms 53 and 54. As will be appreciated, because the nails are removed from a flexible latex material, little if any residue results from the removal operation so that the nailing apparatus is not clogged by tape residue.

While several embodiments of the present invention are described above, it is contemplated that various modifications may be made thereto without departing from the spirit and scope of the present invention. For example, various types and sizes of nails may be used and a variety of flexible adhesive materials may be used on strips of different widths. Moreover, the fabricating of the assemblies of collated nails may be automated. Accordingly, it is intended that the embodiments described be considered only as illustrative of the present invention and that the scope thereof should not be limited thereto but be determined by reference to the claims hereinafter provided.

What is claimed is:

1. An assembly of collated nails comprising:
    a plurality of nails;
    an elongated supporting means; and
    a flexible, nonhardening adhesive material which is supported by said supporting means and in which said nails are partially embedded for holding said nails on said supporting means until a predetermined force applied to said nails removes said nails from said adhesive material.

2. An assembly of collated nails according to claim 1 wherein said supporting means comprises an elongated flat strip of material and said adhesive material comprises a bead of said adhesive material which extends parallel to the edges of said strip.

3. An assembly of collated nails according to claim 2 wherein said adhesive material comprises a mixture of latex and clay filler.

4. An assembly of collated nails according to claim 3 wherein said mixture comprises 20-25% by weight of said clay filler.

5. An assembly of collated nails according to claim 2 wherein said strip of material comprises paper.

6. An assembly of collated nails according to claim 5 wherein said paper comprises the type of paper used for making drywall tape.

7. An assembly of collated nails according to claim 1 wherein said nails are embedded in said adhesive material to a depth of approximately 50% of their diameter.

8. An assembly of collated nails according to claim 1 wherein said supporting means comprises an elongated flat strip and said adhesive material comprises a pair of spaced beads of said adhesive material which extend parallel to the edges of said strip.

9. An assembly of collated nails according to claim 1 wherein said supporting means comprises a plurality of spaced string-shaped members which are embedded in said adhesive material.

10. An assembly of collated nails according to claim 9 wherein said plurality of spaced string-shaped members comprises a pair of spaced substantially parallel string-shaped members.

* * * * *